United States Patent [19]

Käch

[11] 4,112,293
[45] Sep. 5, 1978

[54] OPTICAL FIBER DATA TRANSMISSION SYSTEM

[75] Inventor: Alfred Käch, Untersiggenthal, Switzerland

[73] Assignee: Patelhold Patentverwertungs & Elektro-Holding AG, Glarus, Switzerland

[21] Appl. No.: 777,768

[22] Filed: Mar. 15, 1977

[30] Foreign Application Priority Data

Mar. 18, 1976 [CH] Switzerland .......................... 3399/76

[51] Int. Cl.² ............................................ H04B 9/00
[52] U.S. Cl. .................................. 250/199; 350/96.16
[58] Field of Search ....................... 250/199; 350/96.16

[56] References Cited
U.S. PATENT DOCUMENTS

| 3,870,396 | 3/1975 | Racki | 350/96.16 |
| 3,883,217 | 5/1975 | Love | 350/96.16 |
| 3,888,772 | 6/1975 | Neuner | 250/199 |
| 3,956,626 | 5/1976 | Ross | 250/199 |
| 3,986,020 | 10/1976 | Kogelnik | 250/199 |
| 4,045,792 | 8/1977 | Schaefer | 250/199 |
| 4,062,043 | 12/1977 | Zeidler | 250/199 |

Primary Examiner—Howard W. Britton
Attorney, Agent, or Firm—Frank L. Durr; Orville N. Greene

[57] ABSTRACT

A TT coupler for use in fiber optics data transmission systems wherein the incoming light to the coupler passes to both the receiver of the subscriber station and through the coupler lead toward the next subscriber station in succession in a ratio controlled by the design and geometry of the coupler. Signals not addressed to that station are identified as such by the receiver for that station and are regenerated and/or amplified and then passed to the transmitter for that station to be returned into the appropriate portion of the aforesaid coupler. The failure of one or even several receiver-transmitter facilities in succession will not degrade the system to the level of becoming inoperative due to the coupler design and its interaction with the receiver-transmitter facility at each subscriber station.

Means are provided for monitoring signal strength at each station and for providing necessary amplification in cases where it is so required.

11 Claims, 2 Drawing Figures

OPTICAL FIBER DATA TRANSMISSION SYSTEM

BACKGROUND OF THE INVENTION

This invention concerns a system for data transmission over fiber optics, the individual subscriber stations being connected by way of T-couplers spaced apart along a main fiber optics lead and the coupling-in and coupling-out of the light being effected directionally, so that two T-couplers are necessary for the connection of each subscriber station, which T-couplers form a structural unit designated a TT coupler, the incoming light being divided in the first junction of the TT coupler into two portions of which one passes directly to the receiver of the subscriber station and the second passes directly through the TT-coupler.

Such an arrangement of a TT-coupler with separate directional couplings has been proposed in German patent application No. P 2614051.2 dated Apr. 1, 1976.

Having regard to the optical and mechanical characteristics of the optical fibers, the extracting of light from a bundle of optical fibers or the injection of light into the bundle is for the time being possible only if, at the position concerned, the bundle is completely interrupted and appropriate coupling elements are interposed between the several ends. For the receiver itself a partial interruption would also be possible, but not for the transmitter, since all the fibers of the outgoing bundle must always be energized by the new signal from a subscriber station.

Fiber optics T-couplers of different constructions are known. For example, in the T-coupler shown in U.S. Pat. No. 3,883,217 two series-arranged solid glass cores are interposed between the several faces of the interrupted fiber bundle and the leads to the receiver and from the transmitter and also a direct connection are applied to their internal surfaces. The incoming light signal is thus divided into a portion going to the receiver and a portion passing directly through the coupler. The light passing directly through the coupler and the transmitter signal introduced in the same direction are combined at the output of the TT-coupler into a new transmitted signal. The two solid glass cores arranged in series have the function of a diffuser or scrambler. Light introduced at a point ultimately distributes itself, after traversing a certain length of core, uniformly over the whole core cross-section and thus passes into all the fibers of the outgoing bundle.

In accordance with U.S. Pat. No. 3,870,396 there are interjected between the point faces of the main lead, means including right-angle isoceles triangular glass prisms with their hypotenuse surfaces bridged by a mirror inclined relative to the direction of transmission of the light. This mirror is partly reflective at the position at which energy is to be coupled out to the receiver and fully reflective at another position for the introduction of the transmitter signal. The arrangement operates as a directional coupler, so that two such couplers are required to provide go and return paths.

An objection of principle to the TT-coupler is the relatively high insertion loss of 3-4 dB, resulting from the loss to the ballast and sheath cross-section of the outgoing fiber bundle. Various investigations have shown that it is extremely difficult to reduce this attenuation to a perceptible extent by measures taken at the coupler itself. Referred to a maximum allowable transmission attenuation of, for example, 40 dB between two stations, the main lead may, apart from the fiber attenuation, contain at most 10 such TT-couplers if operation without intermediate amplifiers is desired. Applications are of course conceivable in which the series loss of the couplers is of less importance.

In modern power installations up to 500 connections must be taken into account for data interchange. Intermediate amplifiers must be used here in any case, even if it were possible to reduce the passage attenuation of the TT-coupler by a factor of 10.

It has also been proposed to connect the subscriber stations directly in the main lead, through the employment of intermediate amplifiers. This has the disadvantage that if one station fails, all data interchange is interrupted. It would in fact be possible in principle to provide a direct optical bridge across a defective station, for example by using a Kerr cell or Pockels cell, which procedure is however quite expensive and in no case is without optical problems.

It is a further disadvantage of the known coupler systems that in some cases a certain amount of the transmitted signal may pass directly into the receiver branch of the station's own receiver. In certain applications, such as for example the arrangement according to the invention described below, such a condition is not possible.

Here only a TT-coupler with practically complete decoupling between transmitter and receiver paths can be taken into consideration, such as is described for example in German patent application No. P 2614051.2 already mentioned hereinabove.

BRIEF DESCRIPTION OF THE INVENTION

The invention seeks to solve the problem of providing a transmission arrangement consisting of a TT-coupler and a subscriber's station, and is so arranged that an arbitrary number of such stations may be interposed along a main lead and that, even in the event of failure of one or more stations, data interchange between the remaining stations will definitely be maintained.

According to the present invention this is obtained in an arrangement of the above mentioned type by the following measures:

For the purpose of ensuring continued data transfer between the remaining subscriber stations connected along the main lead in the event of failure of one or more participating stations, each subscriber station also possesses intermediate amplifier characteristics, so that a signal arriving at a subscriber station and not addressed to that station is demodulated, regenerated, and/or amplified within the station, after which it passes into the main lead by way of the second T-coupler; and the attenuation of the individual transmission sections is so chosen, having regard to the limiting sensitivity of the receivers and the instantaneous light output of the transmitter, that in the event of failure of one or more stations, the drop in signal level thus resulting can be made up again by the next following operative station.

BRIEF DESCRIPTION OF THE FIGURES

The invention will now be further described with reference to the accompanying drawing, in which.

DETAILED DESCRIPTION OF THE INVENTION

Figure 1:
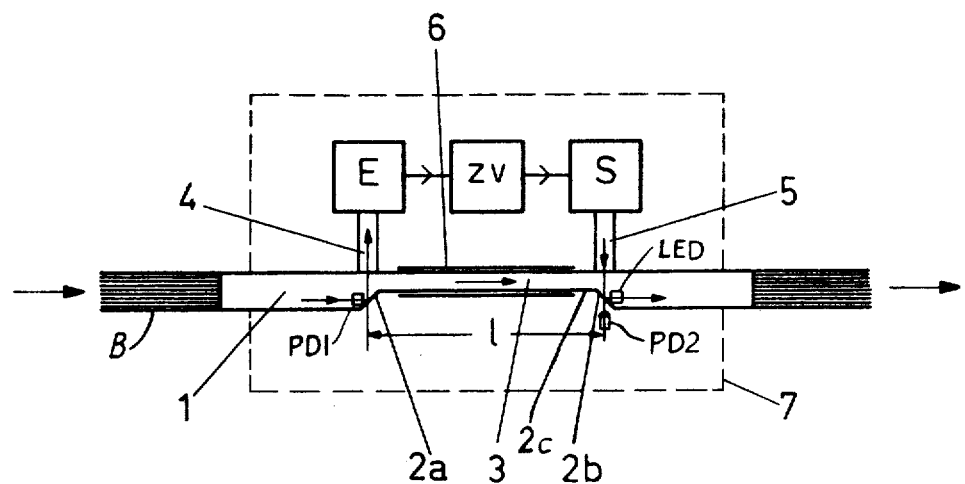
FIG. 1 shows schematically the principle of construction of an arrangement in accordance with the invention.

The arrangement shown in FIG. 1 uses a TT-coupler of the kind described in German patent application No. P 2614051.2 already mentioned above. Between the several surfaces of the main optical-fiber bundle B is interposed a solid glass core 1 with a trapezoidal-shaped recess situated approximately at the center of core 1. The boundary portions are 45° slopes as positions 2a, 2b of the T-coupling, while the long side 2c bounds the intermediate bar 3 connecting the two T-couplers. At the reflective surface 2a a portion of the incident light is deflected along a perpendicular path and into the lead 4 leading to the receiver E; by means of the reflector 2b the light signal coming from the transmitter S through the lead 5 is introduced into the main lead again in the original direction of transmission. The receiver E and the transmitter S of the subscriber station are connected by means of an intermediate amplifier ZV. Received light signals, not addressed to the subscriber station, are demodulated, regenerated and finally, in amplified form, reunited with the light signal directly traversing the lead 3. However, the principal assumption for this mode of operation is that, as is the case for the arrangement of FIG. 1, the receiver input is always sufficiently decoupled from the transmitter output so that no internal positive feedback or self-excitation can occur. The receiver includes a demodulator, a means for identifying its own address for retaining the signals or for transferring signals not addressed to that station to the intermediate amplifier ZV for return to the main lead by transmitter S. FIG. 1 of German Offenbgunschrift No. 2,144,780 layed open Mar. 15, 1973, shows such an arrangement wherein light signals are received and converted into electrical signals of photodiodes D, removed by terminus A which suppresses the light-signals if intended for that subscriber station or permits regeneration and transmission by laser devices L4–L6 if intended for another subscriber station. The subscriber station may also inject electrical signals into the output which are then converted into light signals by lasers L4–L6.

Optically, the combination of the light leaving the transmitter of the subscriber station with the light directly traversing the TT-coupler presents no problems with the non-coherent light sources (for example, light-emissive diodes) typically employed in this multi-mode technique. In particular, because of the temporally and positionally random distribution of the photons there are no phasing or polarization problems. There merely appears in the outgoing light impulse the superposition of the photons passing through the two paths in the time interval, that is, the sum of the instantaneous light powers.

Figure 2:
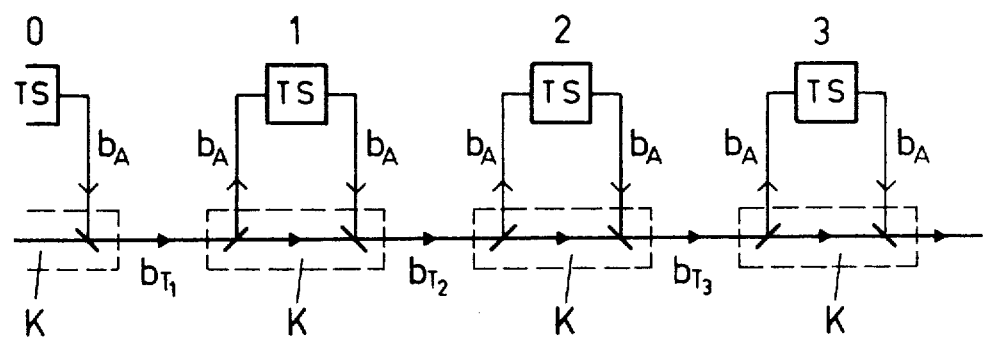
FIG. 2 shows schematically how a plurality of arrangements in accordance with the invention can be connected in a fiber optics network.

FIG. 2 shows a basic diagram of the manner in which the TT-couplers (K) are arranged with several stations (TS) in a linear or ring-like fiber network. The branch attenuation of each station is denoted by $b_A$, the path attenuation between the stations by $b_{Tn}$.

During signal transfer on the one hand by way of the amplifier branch and on the other hand directly through the TT-coupler, transit time differences result at the coupler output between the corresponding light signals, which may lead to disturbing phenomena on demodulation in the subsequent station. In order to prevent this, certain additional means are necessary which will be described below, which additional means are related to information transmission by means of impulses, but this arrangement should not be interpreted in any limiting sense since corresponding means can also be made use of for analog transmission.

With regard to the predetermined maximum allowable transmission attenuation between two adjacent operatuve stations, the attenuation of the individual transmission sections should not exceed certain values if it is required that, upon failure of one station or even of several successive stations, the flow of information between the remaining stations shall be maintained. But on the other hand the individual transmission elements (TT-coupler, main lead) should still be able to be provided at an acceptable cost. The instantaneous ratio of the power division between the receiver path and the straight-through path at the coupler input here plays an important part. Both a high branching attenuation (and thus a small direct-transmission attenuation) and also a very small branching attenuation (accompanied by a high direct-transmission attenuation) reduce the permissible transmission attenuation of the main lead. There obviously exists a particular relation as regards the power division between the receiver path and the direct transmission path for each number $n$ of defective stations, for which the allowable path attenuation between two adjacent operative stations is a maximum. The optimum coupling attenuations of the coupler receiver path ($b_E$) and of the coupler direct-through path ($b_K$) are thus given by:

$$b_E = 10 \log (n+1) \text{ dB}$$

$$b_K = 10 \log (1+1/n) \text{ dB}$$

It follows that the maximum allowable section attenuation $b_{Smax}$ is given by the expression:

$$b_{Smax} = b_{Dmax} - \left( 2b_A + (n+1)b_F + 10 \log \left[ \frac{(n+1)^{n+1}}{n^n} \right] \right) dB.$$

Here $b_{Dmax}$ denotes the maximum allowable transmission attenuation between adjacent operative stations, $2b_A$ the presumably equally great attenuations of the branch leads 4 and 5 (FIG. 1), $b_F$ the specific transfer attenuation between TT-coupler and fiber bundle, and $n$ the number of successive defective stations.

The distribution of power between the receiver path and the direct-through path must be in the ratio of $1/n$. The attenuations of the branch leads 4 and 5 effectively result in a reduction of the maximum allowable transmission attenuation $b_{Dmax}$ and should therefore be kept as small as possible. In the optimum case where $b_A = 0$, if $b_{Dmax} = 40$dB is taken for example as the maximum allowable transmission attenuation and $b_F = 4$dB the transmission attenuation between TT-coupler and fiber bundle, then for the particularly admissible total section attenuation and the corresponding coupling attenuation the following numerical values are obtained ($z$ = number of line sections between the successive stations that may become defective).

| n | 0 | 1 | 2 | 3 | 4 |
|---|---|---|---|---|---|
| | All values in dB | | | | |
| $b_{Smax}$ | 36 | 26 | 19.7 | 14.2 | 9.1 |
| $b_e$ | 0 | 3.01 | 4.77 | 6.02 | 6.99 |
| $b_h$ | ∞ | 3.01 | 1.76 | 1.25 | 0.97 |

-continued

| n | 0 | 1 | 2 | 3 | 4 |
|---|---|---|---|---|---|
| $z = n + 1$ | 1 | 2 | 3 | 4 | 5 |

The distribution of the total attenuation $b_{Smax}$ between the $z$ line sections is thus optional within certain limits. The allowable section attenuation diminishes rapidly, as is seen, with increasing values of $n$. With the low-loss optical fibers that are presently available the realization of even relatively small values is possible. The larger $n$ can be chosen, the greater is the reliability of transmission. In practice the case where $n = 1$ is often sufficient; in special cases, however, values of $n = 2$ or $n = 3$ may be required.

In order to be able to make full use of the dynamic range of the receiver it is necessary in normal operation to work with optimum transmitter power and measured high receiver sensitivity. In the extreme case where the section attenuation corresponds to the highest permissible values, the drop in level upon failure of one station ($n = 1$) is about 20dB, with the simultaneous failure of two successive stations ($n = 2$) about 25dB. The useful signal is then constituted by the transmitter impulse of the last preceding operative station. The dynamic range of the receiver, including a certain reserve, must amount to some 30dB, a value which is capable of being readily obtained.

A first possible manner of interference suppression consists in assuring that in the plane of any one transmitter in-coupler all the light signals of the preceding stations appear attenuated to such an extent that in the next subsequent station they are suppressed by pulse gating with a sliding threshold, e.g. at half the impulse height. This may be accomplished by a Schmitt trigger, for example, which changes state abruptly when the input signal crosses a predetermined triggering level, i.e. a threshold set at half-impulse height. The level is maintained until the impulse falls below the threshold level. The output of the Schmitt trigger is then amplified, which amplified output is free of noise. A suitable Schmitt trigger is shown in FIG. 28.11 page 382 of the text "Transistor Circuit Design" published by the McGraw-Hill Company Copyright 1963 by Texas Instruments Incorporated. Since the amplitude of the impulses to be detected is proportional to the instantaneous light power, a power difference by a factor of 10 should be quite sufficient for this purpose. It is true that this imposes a condition, that the total transmission attenuation between the planes of the transmitter in-couplers of two adjacent stations should not exceed a certain value (e.g. 10dB). However, this condition is already fulfilled in practice by the individual attenuations of the transmission elements (TT-coupler, main lead). The intrinsically relatively high transmission attenuation of the TT-coupler is here made use of directly, in order to separate the interfering impulses from the signal impulses. With $n$ stations liable to failure, the minimum attenuation $b_{Tmin}$ of the sections (of the main lead) is summed over the $z = (n+1)$ sections. For this reason it is necessary to take care that the condition $(n+1)b_{Tmin} \leq b_{Smax}$ is fulfilled as regards the total transmission attenuation between two adjacent operative stations. With the above-mentioned numerical values, for example, this inequality may be maintained with a margin, for $n = 1$ and $n = 2$.

At least from the theoretical viewpoint a still more advantageous solution would consist in making the attenuations of the individual transmission elements as small as possible and instead including an attenuating element in the intermediate lead 3 of the TT-coupler. Since this is always introduced after the receiver branching, only $n$ such attenuations, instead of $n+1$, need be considered for total transmission attenuation in the event of allowing $n$ stations to be defective. It is true that the reduction in transmission attenuation thus obtained is, at least at present, counterbalanced by the not wholly avoidable attenuation of the individual transmission elements, so that the actual gain under the circumstances appears hardly appreciable. It is also necessary to deal with the case where one station slowly becomes defective, for example, as a result of a gradual falling-off in the emission of the light-emissive diode. The condition could then arise that the transmitter impulse and the interfering impulse passing directly through the coupler have equal amplitudes, so that unambiguous demodulation in the subsequent station would no longer be possible. Such an operating condition may readily be determined by a monitor in the transmitter, which indicates an impermissible reduction of the transmitter power and if appropriate, then takes the respective subscriber station out of action. This increased expense need hardly be considered, since continuous supervision of the individual transmitter levels is desired in any case. A fraction of about 10% is sufficient for monitoring, which corresponds to a power loss of only 0.4dB. A suitable arrangement for use in the transmitter S is shown, for example, in Figure 1, page 146 of the "Report on The First European Conference on Optical Fibre Communication", 16–18 September 1975 which shows a 32 megabit/second regenerative repeater while page 144 provides an accompanying description.

A further possibility for interference suppression is to compensate for the different transmission times of transmitter pulses and interfering pulses by giving the intermediate lead 3 an appropriate length $l$. This compensation does not appear to be critical. Differences in transit time between corresponding information signals are noticeable as jitter upon demodulation, so that a certain worsening of the signal-to-noise ratio results. Values of up to about ±15% of the actual pulse period are allowable. In order to obtain an equalizing length which is as short as possible, as small a delay as is possible in the amplifier branch should be sought after, that is, short lengths of the branch leads 4 and 5, small transit time in the electrical circuits, and so on. When using presently available, relatively cheap TTL-Schottky low-power technology, a minimum transit time of some 50nS may be expected. By means of the faster ECL circuitry, considerably shorter transit times may be obtained.

With the series connection of a plurality of stations along a main lead the actual transit time differences appear greater and greater. On the other hand, each signal directly traversing the main lead is so attenuated, as a result of the relatively high transmission attenuation of the TT-coupler alone that, as shown by the values of attenuation given above, the arrangement has become inoperative after five stations at most (total attenuation 40–50dB). To deal with a large number of such stations it is sufficient in this case to relate possible delay time influences merely to a succession of five stations.

In order, for example, to equalize a delay time of 50 nS the lead length must be about 10 meters. Assuming a maximum bit frequency of, e.g. 10 Mbits/sec. (that is, 100 nS per pulse period) and a total jitter of ±10% after five stations, the length of this lead must correspond to exactly ±40 cm. Moreover, an additional equalizing element can be introduced into the amplifier branch, which makes possible a certain amount of fine equalization within the range of spread of a cut length of lead. To introduce delay leads the intermediate bar 3 of the TT-coupler must of course be split, so that the solid glass core then preferably consists of two equal halves.

For the purpose of suppressing background noise impulse gating to half impulse amplitude with sliding threshold is also used here in the receiver. Moreover, in the normal case, because of the attenuation of the equalizing lead there exists, circumstances permitting, even higher transmission attenuation between the stations, that is, likewise an attenuation of the interfering signal by at least 10dB with respect to the useful signal. With this concept delay-time equalization can first become effective if the useful impulse and the interfering impulse exhibit about the same amplitude. Such cases are conceivable, for example, if due to the local conditions, especially long branch leads must be provided, so that relatively small transmitter powers are available. For these signal-level conditions the method of delay-time equalization supplements the first-mentioned possibility of interference suppression.

The most suitable arrangement appears to be a mixed application of the two possibilities explained above. As a practical matter, it is not possible to dispense with continuous monitoring of the individual transmitter powers. In the normal case all the assumptions for the use of the first-mentioned method are thus always fulfilled. The inclination of delay-time equalization should therefore be predominantly limited to individual cases.

Any transparent material (silicate glass or transparent acrylic resin) may be used for the "solid-glass" core 1. As an alternate to a circular cross-section, rectangular or square cross-sections may be employed, the ends of the fiber bundle may readily be adapted to any shape. To obtain low initial losses, especially for short lengths, completely transparent material is advantageously employed for the branch leads 4 and 5. It is however possible to place the photo-diode PD1 and the light-emissive diode LED directly against the coupler surfaces 2a, 2b. For monitoring the transmitter power a small fraction may, for example, be branched off directly from the light-emissive diode or there may be arranged on the side of the solid transparent core 1 opposite to the transmitter coupling 5 a photodiode PD2 which receives stray light from the transmitter signal or which is illuminated through a small aperture in reflector 2b. Attenuation in the lead 3 may be produced, for example, by an absorbent sheathing layer 6, preferably of a material whose refractive index is equal to or greater than that of the lead material. The lead used for delay time equalization, when present, may in accordance with its length be a fiber bundle or a solid material (transparent acrylic resin, for example) low input loss again resulting with the latter. Because the lengths of the leads 4 and 5 between the TT-coupler and the subscriber station are preferably kept as short as possible, the two systems are advantageously fitted in a common housing, as is indicated in FIG. 1 by the broken line 7.

Instead of the TT-coupler represented in FIG. 1, any other known coupling system may be used, in which the transmitter and receiver paths are sufficiently decoupled. The transmitting and receiving stations thus provided are merely to supplement the intermediate amplifier and for the reasons stated above it is necessary to take care that upon demodulation no interference occurs between the amplified light signals and those passing directly through the coupling system.

Each subscriber station is thus likewise an intermediate amplifier. A program intended for this station is thus separated, while information called-up is introduced anew. Programs not addressed to the station are merely increased in level and are passed on unaltered.

The advantages of the arrangements according to the invention are obvious. When a station become defective the signal traversing the TT-coupler directly is always still present, so that the whole remaining data transfer is still maintained. The drop in level that appears is not large and can be readily made up by the subsequent stations. If the respective transmission alternations can be kept sufficiently small, even two or more successive stations may become defective. Additionally, several such groups could become defective, provided that at least one operative station remains between them. In accordance with this arrangement, 50% of a plurality of stations arranged along a main lead may become defective provided that a defective group includes only one station ($n = 1$), ⅔ of all the stations if $n = 2$, ¾ of all the stations if $n = 3$, and so on. Unhindered data transfer between the remaining stations is then always still possible. Since the probability of the simultaneous drop-out of several successive stations is extremely slight, very high reliability of transmission is ensured with this arrangement.

Seemingly, rather narrow limits are imposed in the permissible section attenuations. However, the stated numerical values correspond merely to the present state of the art. The conditions become increasingly more favorable if, for example, a higher maximum allowable transmission attenuation may be assumed. Among additional possibilities are higher transmitter power, greater limiting sensitivity of the receiver and better diode coupling which values have not been optimized at all at the present time.

The described coupling system makes information interchange possible with great reliability in linear fiber optic networks. Each subscriber station operates also as an intermediate amplifier and is connected in shunt with the main lead. The connection of over a hundred such stations is possible.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. An optical fiber data transmission system in which the individual subscriber stations are connected by means of T-couplers arranged at discrete positions along a main lead and the coupling out and in of the light is effected directionally, so that two T-couplers are necessary for the connection of one subscriber's station, which effect directional coupling and collectively form a unit termed a TT-coupler, the incoming light being divided into two components in the first T-divider of the TT-coupler, of which one of said components passes to the receiver of the subscriber station and the second of said components passes directly through the TT-coupler, and wherein for the purpose of ensuring continued data transfer between the remaining subscriber stations connected along the main lead in the event of failure of one or more subscriber's stations, each subscriber station further possesses intermediate amplifier means for demodulating a signal arriving at a subscriber station said demodulating means including means for regenerating a signal not addressed to that station transmitter means responsive to the regenerated signal for passing the signal into the main lead by way of the second T-coupler, and wherein the attenuation of the individual transmission sections of the TT-coupler is so chosen, having regard to the limiting sensitivity of the receivers and the instantaneous light output of the transmitter means, that in the event of failure of one or more stations, the drop in signal level thus resulting can be compensated for by the next following operative station so as to be returned to a signal level within the normal operating range.

2. A system in accordance with claim 1 wherein at each subscriber's station, for signals not addressed to that station, the output signal of the receiver is applied to the input of an intermediate amplifier and the output of the intermediate amplifier is connected to the input of the transmitter.

3. A system in accordance with claim 1 wherein disturbances arising upon demodulation as a result of transit-time differences between the light signals amplified in the subscriber station and those passing directly through the TT-coupler are avoided by means which are provided at each station which if necessary attenuate all the light signals of the preceding station with respect to the level of signals coupled into the main lead from the transmitter of that station, to such a degree that in the next subscriber station these signals are suppressed by pulse clipping with sliding threshold to half the pulse height.

4. A system in accordance with claim 1 wherein equalization of the transit time differences between the transmitter impulses and interfering impulses is effected by appropriate choice of the length of the direct connection in the TT-coupler between the first T-coupler of the receiver branch and the second T-coupler of the transmitter feed-in.

5. A system in accordance with claim 1 wherein the division of power between the receiver branch and the direct through-lead at the first T-coupler is at least approximately in the ratio $1/n$, where $n$ is the number of successive defective stations for which the system is required to remain operative.

6. A system in accordance with claim 5 wherein $n = 1$.

7. A system in accordance with claim 5 wherein $n = 2$.

8. A system in accordance with claim 5 wherein the smaller cross-section of the direct optical connection between the input and output portions of the TT-couplers when compared to the full cross-section of the TT-coupler is similar to the ratio by which a portion of the light injected into the TT-coupler is deflected into the receiver branch in the first T-coupler.

9. A system in accordance with claim 8 wherein the TT-coupler comprises a single solid transparent body interposed between the joint faces of the fiber bundle forming the main lead, which body is reduced in cross-section over a certain length disposed intermediate its end portions to the required cross-section for the said direct connection and wherein slanting transitions between said end portions and said reduced portion form reflectors inclined at 45° that act as coupling surfaces reflecting light into or from said T branches.

10. A system in accordance with claim 9 wherein optical leads are provided between said slanting transition serving to extract light from the main lead and the receiver to direct light to the receiver and also between the transmitter and the slanting transition serving to introduce light from the transmitter into the main lead.

11. A system in accordance with claim 6 wherein a photodiode forming the receiver and a light-emissive diode forming the transmitter are applied directly to the solid body opposite the coupling surfaces for respectively sensing light and injecting light at their respective locations.

* * * * *